June 8, 1943.  R. F. SICKLES  2,321,161
ELECTRICAL ASSEMBLY
Filed March 12, 1941
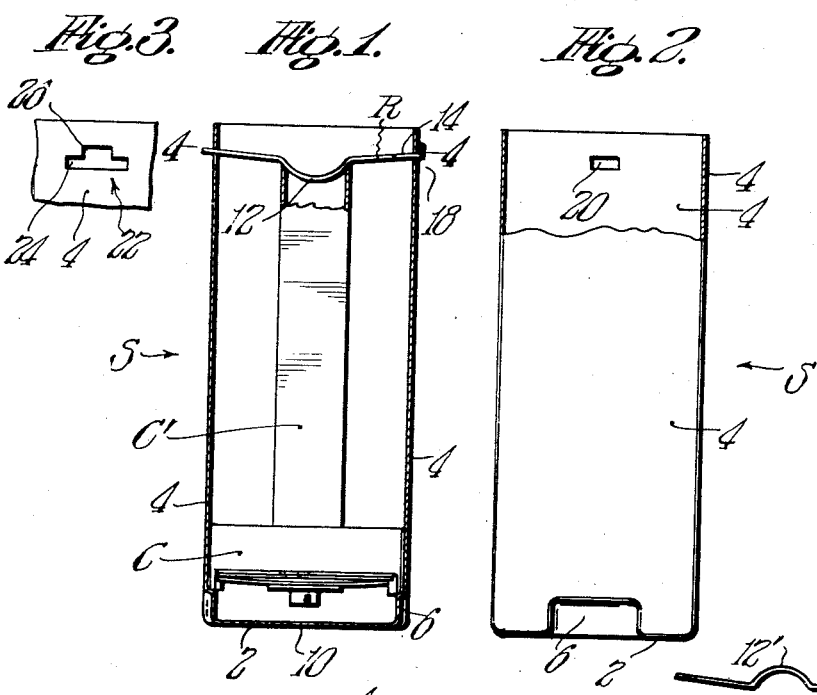
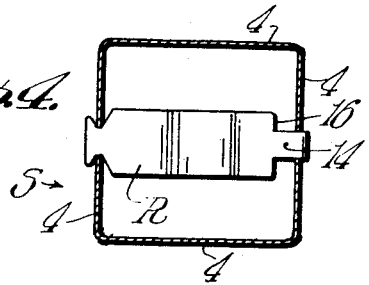
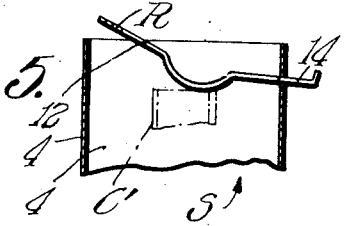
INVENTOR.
Royal F. Sickles.
BY Walter C. Ross, Attorney.

Patented June 8, 1943

2,321,161

UNITED STATES PATENT OFFICE 2,321,161

ELECTRICAL ASSEMBLY

Royal F. Sickles, Springfield, Mass., assignor to The F. W. Sickles Company, Chicopee, Mass., a corporation of Massachusetts Application March 12, 1941, Serial No. 382,949

2 Claims. (Cl. 220—55)

This invention relates to improvements in electrical apparatus and is directed more particularly to improvements in unitary assemblies for circuits such as are used in radio apparatus and the like.

The principal objects of the invention are directed to the provision of a unitary construction wherein the components of an electrical unit are secured together in assembled relation, the novel construction being characterized by its efficiency of manipulation, simplicity and low cost of manufacture.

The various novel features and advantages of the invention will be hereinafter referred to in connection with the present preferred form of the invention with reference to the drawing, wherein:

Fig. 1 is a sectional elevational view through an electrical unit embodying the novel features of the invention.

Fig. 2 is a side elevational view of the shield member of the unit shown in Fig. 1 with parts in section;

Fig. 3 is a partial side elevational view of the shield member shown in Fig. 1;

Fig. 4 is a sectional plan view on the line 4—4 of Fig. 1;

Fig. 5 is a partial sectional view of the upper portion of the shield member to explain certain novel features of the invention; and Figs. 6, 7 and 8 are side elevational or edge views of modified forms of the retainer member of the invention.

Referring now to the drawing more in detail the invention will be fully described.

In describing the invention reference will be made to a unit such as used in connection with radio apparatus where it is ordinary practice to provide such elements as a coil or coils and a condenser or condensers in a metal shield.

It is an object of this invention to provide means to hold and maintain the elements or the unit within the shield without relative displacement or shifting. It will be obvious that various combinations of elements may be used in a shield and therefore it is not desired to be limited to the specific elements referred to.

In the drawing a condenser is represented by C and a coil is represented by C' which constitute a unit and are disposed in a shield S. In the form of the invention shown the coil C' is tubular in form but as is well known coils are made in various forms.

Hereinafter the coil and condenser will be referred to as a unit so as to embrace other elements than those shown which it is desired to enclose in a shield. The shield S has end and side walls 2 and 4 which may be arranged to provide a shield of any form or size desired.

The unit is supported by one or more ledges which are formed by displacing or indenting the wall or walls of the shield as at 6. At least a wall portion or portions of the shell is displaced or offset inwardly to form the ledge or ledges.

This may be accomplished by some method of forming the shield or by severing a portion or portions thereof and displacing the same inwardly. In the form of the invention shown the unit is suitably supported by the supporting ledge or ledges so that the underside thereof is spaced upwardly from the end wall 2 and one or more holes 10 in the end wall permit access to the unit as may be necessary or desired. It will be obvious that there may be as many supports associated with as many walls as may be desired.

A retaining member R for yieldingly bearing on the unit is provided which has end parts receivable in apertures of opposite side walls of the shield. The retainer is preferable of spring-like material so that when in place it yieldingly engages the unit.

The retainer R may be of any width desired but according to the form of the inventions shown in Figs. 1, 4 and 5 it has a depressed or projecting part 12 that is adapted to engage the upper end of the element C' which is shown as being hollow to more or less receive the same.

One end part of the retainer is in the form of a tongue 14 that is narrower than the main body thereof to provide a shoulder or shoulders such as 16 and this tongue has an end lug 18 on its extremity. A receiving aperture 20 is provided in one side wall of the shield for receiving the tongue 14 and this is preferably rectangular in shape as shown in Fig. 2. This aperture is such as to permit insertion of the lug and tongue therein as well as tilting and sliding movements thereof.

The opposite end part of the retainer is provided with notches disposed on opposite side edges thereof as shown in Fig. 4. The aperture 22 of the opposite side wall of the shield has a lower wide part 24 and a relatively narrower upper part 26, the lower part 24 being of a width to slidably receive the notched end or main body of the retainer while the upper part 26 is of such a width that its side edges receive and fit snugly within the notches of the retainer when the retainer is in retaining position.

The shape of the tongue, apertures, and notches may be varied if desired. As stated the retainer is preferably of spring-like material so that when held in position in the slots and above the unit it exerts a yielding pressure on said unit to hold it against longitudinal shifting movements as well as against lateral shifting, as will appear.

With the unit in place in the shield and being supported by the ledges described or by some other suitable means the retainer is applied in the following manner:

The tongue 14 of the retainer is inserted in the aperture 20 of the wall of the shield and moved longitudinally and angularly until the shoulders 16 of the retainer engage the shield wall as shown in Fig. 5. The parts are so proportioned that in this position the opposite notched end of the retainer may be depressed so that said end passes downwardly inside the said opposite wall.

The free end of retainer is depressed so that the retainer engages the element C' and the said end is in alignment with the larger lower part 24 of aperture 22. Then the retainer is moved to the left so that the free end thereof enters said wider part 24 of the aperture 22 with the notches in substantial vertical alignment with the side edges of the narrow portion 26 of said aperture. In this position the free end of the retainer is released or is allowed to move upwardly so that the notches and side edges of slot 26 are engaged as in Fig. 4.

The tension is such that pressure is applied to the unit while the ends of the retainer are urged upwardly in their respective apertures. Thus the unit is yieldingly urged downwardly against the support therefor while the retainer is locked to the wall of the shield against longitudinal movements by reason of the edges of the aperture which are seated in the notches.

In this way the notched end of the retainer is releasably secured to the wall of the shield to prevent shifting thereof and of the unit on which it yieldingly bears. Even in case one of or the opposite wall of shield is displaced by accident or otherwise the retainer and thereby the unit is held by the notched engagement with the wall of the shield.

To remove the retainer its notched end is depressed to unlock the notches and aperture and then it is moved inwardly until the said end may move or be moved upwardly past the wall of the shield. The lug 18 on the end of the tongue is provided to prevent unwanted separation of the retainer and shield when in unit non-locking position.

The retainer may be formed to have engaging means of various forms. As in Fig. 6 the engaging means 12' is the reverse of that shown in Fig. 1. In Figs. 7 and 8 the retainers R2 and R3 have one or more projections 30 and 32. The shape and dimensions of the retainer may of course be varied within wide limits to accommodate various elements, conditions and uses.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. The combination of a shield having opposite side and bottom walls with a unit mounted centrally thereof with means for holding said unit against shifting in the shield comprising, one wall of said shield provided with an entrance opening for slidably receiving the tongue of a retainer and the wall opposite thereto provided with an aperture having a wide lower portion for slidably receiving the locking end of a retainer and a relatively narrower upper locking portion, the opening and aperture lying approximately in the plane of the upper end of the unit, and a retainer of yieldable metal having a tongue at one end and provided at its other locking end at opposite longitudinal sides thereof with opposed notches open at said longitudinal sides, all adapted whereby the tongue of the retainer may be inserted in the entrance aperture of said one wall to position said retainer over said unit and permit its locking end being moved downwardly past the said opposite wall into alignment with the lower portion of the aperture therein the intermediate portion of the retainer contacting said unit and then moved longitudinally to enter said locking end in the lower portion of the aperture with the notches thereof in alignment with the sides of the locking aperture and then released so that the notches and sides of the locking portion are in locking engagement to prevent longitudinal shifting of the retainer relative to the walls of the shield.

2. The combination of a shield having opposite side and bottom walls with a unit mounted centrally thereof with means for holding said unit against shifting in the shield comprising, one wall of said shield provided with an entrance opening for slidably receiving the tongue of a retainer and the wall opposite thereto provided with an aperture having a wide lower portion for slidably receiving the locking end of a retainer and a relatively narrower upper locking portion, the opening and aperture lying approximately in the plane of the upper end of the unit, and a retainer of yieldable metal having a tongue at one end and provided at its other locking end at opposite longitudinal sides thereof with opposed notches open at said longitudinal sides, all adapted whereby the tongue of the retainer may be inserted in the entrance aperture of said one wall to position said retainer over said unit and permit its locking end being moved downwardly past the said opposite wall into alignment with the lower portion of the aperture therein the intermediate portion of the retainer contacting said unit and then moved longitudinally to enter said locking end in the lower portion of the aperture with the notches thereof in alignment with the sides of the locking aperture and then released so that the notches and sides of the locking portion are in locking engagement to prevent longitudinal shifting of the retainer relative to the walls of the shield, the said retainer intermediates its opposte ends provided with a portion disposed in a plane offset from the normal plane thereof for engaging said unit in said shield.

ROYAL F. SICKLES.